March 8, 1955  A. P. CHARBONNEAU  2,703,481
CIRCUIT CONTROLLING DEVICE FOR REFRIGERATING
SYSTEMS AND THE LIKE
Filed Sept. 27, 1950  2 Sheets-Sheet 1
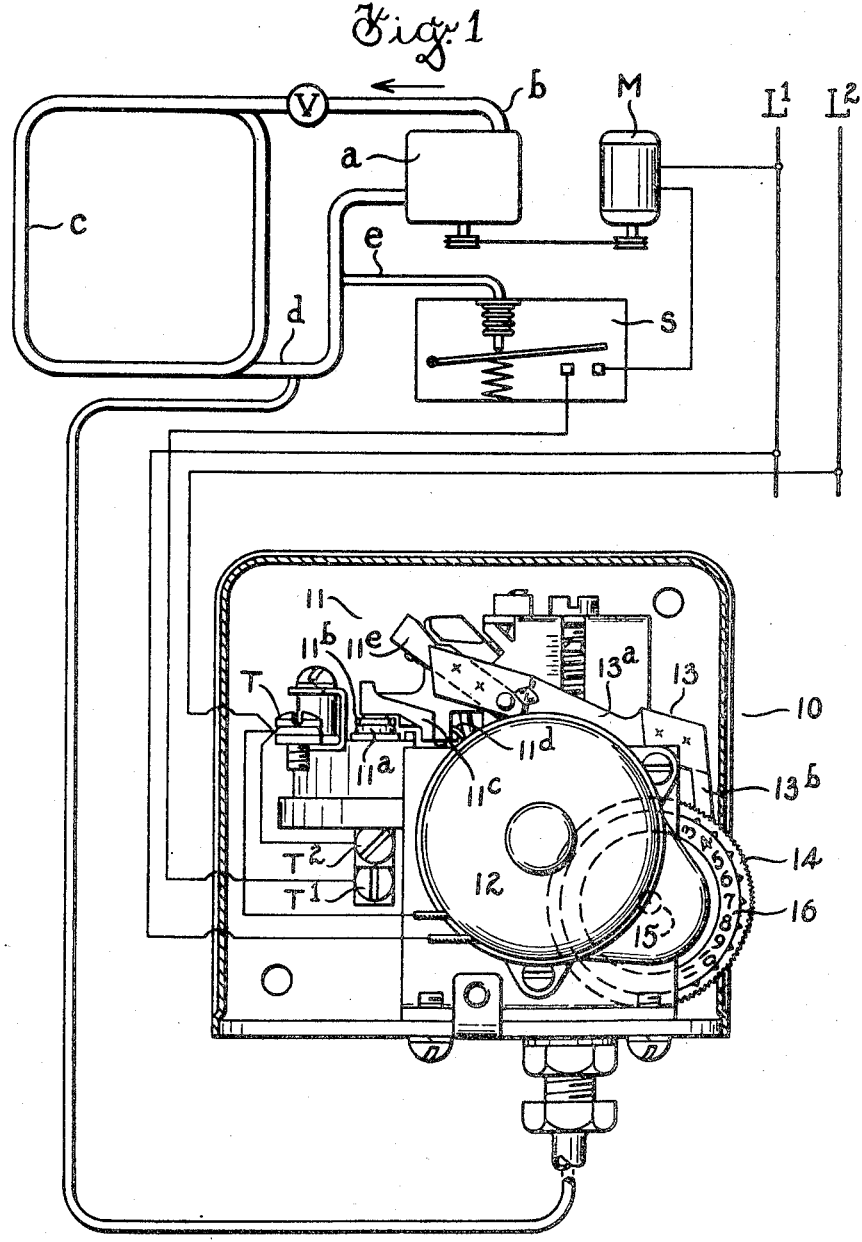
Inventor
Allan P. Charbonneau
By W. E. Bryon
Attorney March 8, 1955  A. P. CHARBONNEAU  2,703,481
CIRCUIT CONTROLLING DEVICE FOR REFRIGERATING
SYSTEMS AND THE LIKE
Filed Sept. 27, 1950  2 Sheets-Sheet 2
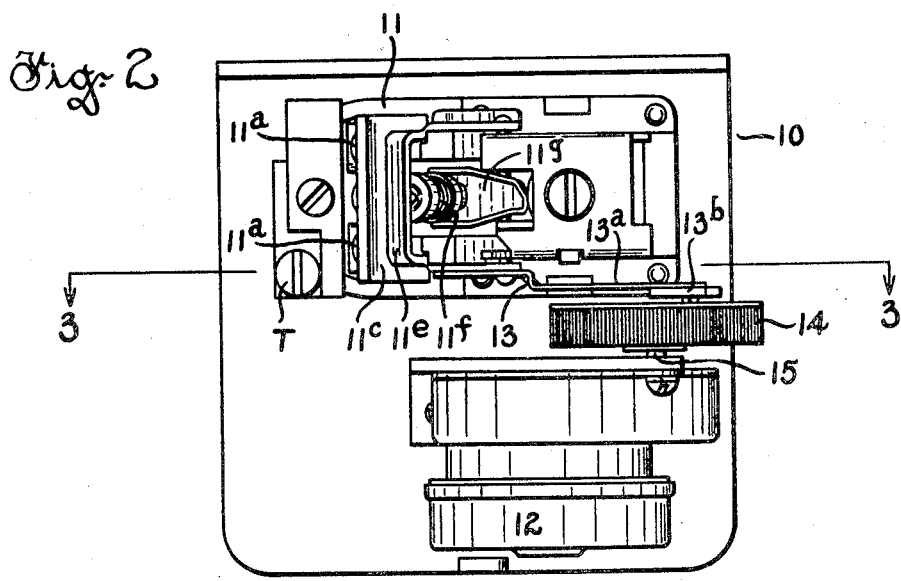
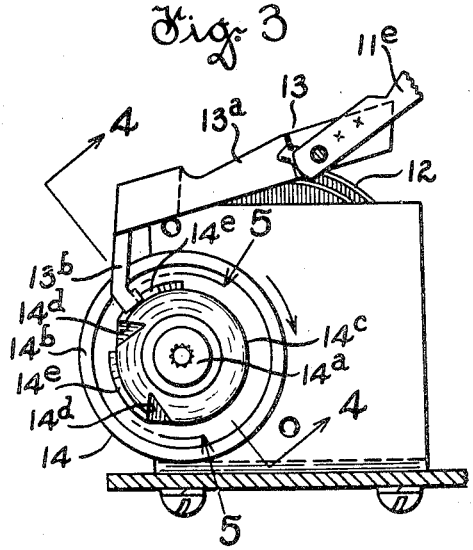
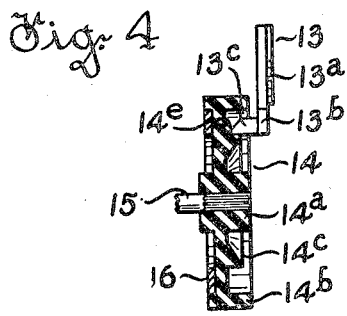
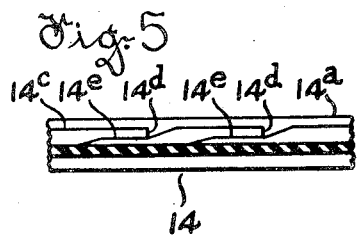
Inventor
Allan P. Charbonneau
By W. E. Hyou
Attorney

United States Patent Office 2,703,481
Patented Mar. 8, 1955

2,703,481

CIRCUIT CONTROLLING DEVICE FOR REFRIGERATING SYSTEMS AND THE LIKE

Allan P. Charbonneau, Wauwatosa, Wis., assignor to Cutler-Hammer, Inc., Milwaukee, Wis., a corporation of Delaware Application September 27, 1950, Serial No. 187,106

7 Claims. (Cl. 62—4)

This invention relates to circuit controlling devices, and more particularly to devices adapted for controlling electric refrigerators to afford fully automatic defrosting thereof without danger of food spoilage or thawing of frozen items.

In the prior art appear many forms of fully automatic defrosting devices for electric refrigerators, all of which in general fall into one of two categories, i. e., either they are of the type which effects a defrost period for a fixed period of time without regard to the temperature effected in the refrigerator during such period, or of the type which periodically causes the refrigerator to cycle at a somewhat higher temperature range for a period of time to effect defrosting. In either case the defrost period is ultimately based on a time interval and is not positively responsive to conditions within the refrigerator for termination of the defrost period. Accordingly, defrost periods afforded by prior art devices are calculated to extend over a period of time thought to be sufficient for defrosting the maximum accumulation of frost and result generally in a defrost period of longer duration than necessary. The defrost periods afforded by such devices ultimately depend on calculations which at best must be based on a guess as to average conditions involving a number of variables, such as variations in the rate of ice or frost accumulation, variations in ambient temperature conditions, manufacturing tolerances in the timing device, etc.

The present invention has among its objects the provision of a circuit controlling device affording fully automatic defrosting of electric refrigerators which will initiate a defrost period at predetermined time intervals and which will automatically maintain such defrost period for the shortest period of time necessary to accomplish defrosting of the refrigerator.

More particularly, an object of the invention is to afford a circuit controlling device which will initiate a defrost period chronometrically and positively terminate the same in response to operation of pressure or temperature responsive means.

Another object of the invention is the provision of circuit controlling means for defrosting refrigerators which will initiate a defrost period at predetermined intervals only and will, in response to operation of pressure or temperature responsive means indicative of defrosting temperature in the refrigerator, completely terminate the defrost period thereby cutting off the defrost period automatically within the shortest possible time.

Another object is to provide a circuit controlling device for refrigerators to afford automatic defrosting thereof which will initiate a defrost period chronometrically by opening the motor circuit and positively terminate the defrost period in response to operation of pressure responsive means by closing the circuit without further cycling of the defrost mechanism.

Another object is to provide a circuit controlling device with latching means under the control of chronometric means which will latch such circuit controlling device in a given position and permit movement to unlatched position at predetermined time intervals only.

Another object is to provide latching means for circuit controlling devices adapted to afford automatic defrosting of electric refrigerators, which latching means will afford unlatching of said control device at predetermined intervals to initiate a defrost period and having once unlatched said control device will relatch the same in response to pressure responsive means to terminate the defrost period and will thereafter positively maintain the control device in latched position until time for another defrost period.

Another object is to provide a latching means of the aforementioned character which will positively reset regardless of manufacturing tolerances.

Another object is to provide a latching mechanism of the aforementioned character which is simple and rugged in construction and which may be applied to existing switches.

Another object is to provide a defrosting device for electric refrigerators adapted to be used in conjunction with normal control means to periodically frustrate the latter, but which defrosting device will not of itself cycle, thereby maintaining such period of frustration for a period sufficient only to effect defrosting.

Another object is to provide an automatic defrost mechanism of the aforementioned character which may be added to existing refrigerating systems without alteration thereof and without addition of other devices or parts.

A still further object is to provide a combined cam and time setting member for mechanisms of the aforementioned character which is simple in construction and affords ease of operation.

Various other objects and advantages of the invention will hereinafter appear.

The accompanying drawings illustrate an embodiment of the invention which will now be described, it being understood that the embodiment illustrated is susceptible of modification without departing from the spirit and scope of the appended claims.

In the drawings,

Figure 1 is a side elevational view of a control device embodying the invention shown in conjunction with a schematic representation of a typical refrigeration system. The cover of the control device is broken away for purposes of illustration;

Fig. 2 is a top view of the control device illustrated in Fig. 1 with the cover removed;

Fig. 3 is a sectional view taken on the line 3—3 of Fig. 2;

Fig. 4 is a fragmentary sectional view taken on the line 4—4 of Fig. 3; and

Fig. 5 is a developed view of the cam member illustrated in Fig. 3 taken on the line 5—5 thereof.

Referring to the drawings, a circuit controlling device designated generally by the reference numeral 10 is shown in Fig. 1 as an automatic defrosting mechanism for a conventional refrigeration system comprising an electric motor M for operating a compressor-condenser $a$ for compressing a volatile refrigerant of well-known type. A pipe $b$ connects the high pressure side of the compressor through valve V to the low pressure cooling pipes or units $c$ in the region which is to be refrigerated. Evaporation takes place and the vapor is drawn through pipe $d$ to the low pressure side of the compressor to complete the cycle.

Motor M is under the control of a switch S of any well known form having a pipe $e$ connecting with pipe $d$ at one end and a metal bellows of the switch at the other end to render switch S responsive to variation in pressure, thereby affording cycling of the motor M in a well known manner to maintain the evaporator within a given temperature range, generally below 32° F.

As will be seen from the drawings, defrosting switch 10 is placed in series relation with the normal control switch S, the circuit being traced from $L^1$ to the motor M, thence through switch S, to switch 10, and back to $L^2$. Accordingly, opening of the contacts of switch 10, as will hereinafter be described, will open the circuit to motor M regardless of the position of switch S, thereby for a time frustrating the latter. Thus the defrost switch may temporarily disable switch S to allow the evaporator to rise a predetermined number of degrees above 32° F. to afford melting and hence removal of the coating of frost which normally builds up thereon.

Defrosting mechanism 10 is designed to initiate such a defrosting period chronometrically at selected times and to positively terminate such defrosting period the first time the evaporator temperature rises a predetermined number of degrees above 32° F., thereby cutting the duration of the defrost period to a minimum. Such operation is accomplished in general through operation of switch 10 to open the motor circuit to initiate the defrost period (thereby disabling switch S as hereinbefore described) and closing the circuit to restore control to switch S to terminate the defrost period.

The circuit controlling device 10 consists in general of a pressure responsive snap action switch means 11, a chronometric device, as for example, a small synchronous motor 12 as illustrated in the drawings, and a latching mechanism for latching the switch means 11, such latching mechanism comprising generally a latching arm 13 (Fig. 3), and a time setting cam member 14 driven by the chronometric device 12 through a suitable gear train (not shown).

The switching means 11 is of the general construction of that illustrated in Kuhn Patent No. 2,158,824 to which reference may be had for the details of construction and operation, it being necessary here to note merely that the switching means 11 includes a pair of stationary contacts 11$^a$ to be bridged by a contactor 11$^b$ carried by a pivoted insulating member 11$^c$. A spring 11$^d$ (Fig. 1) is attached to member 11$^c$ to normally bias contactor 11$^b$ into bridging engagement with the stationary contacts 11$^a$. A pivoted U-shaped member 11$^e$ having a lost motion connection with insulating member 11$^c$ carrying contactor 11$^b$, is adapted to move the latter to open-circuit position in response to a snap acting mechanism comprising an over-center spring 11$^f$ (Fig. 2) and a pivoted lever 11$^g$, the latter being actuated by a pressure or temperature responsive bellows (not shown) of well known form connected to the refrigerating system as heretofore described. It is to be understood that the switching mechanism 11 is so adjusted as to respond to temperatures or pressures in range somewhat above the range of switch S; that is, switch 11 would ordinarily be actuated to open-circuit position at a temperature or pressure above that of the opening point of switch S, and will, of course, be actuated to closed circuit position at a temperature or pressure substantially above that of switch S and above 32° F. to permit defrosting of the refrigerator.

Rigidly attached to one leg of member 11$^e$ is a latching arm 13 comprising a relatively thin, resilient intermediate portion 13$^a$ and a hook-like portion 13$^b$ (Fig. 4) adapted for engagement with cam member 14 as a cam follower.

Cam member 14 is preferably a molded insulating member of circular or disc form having a cylindrical hub portion 14$^a$ for attachment to a shaft 15 connected to the chronometric means 12 for rotation of cam 14 in a given direction (clockwise as viewed in Fig. 3). Member 14 is also provided with a knurled rim portion 14$^b$ and a ridge 14$^c$ formed on one face thereof intermediate said rim and said hub portions and concentric therewith. As best shown in Fig. 4, the innermost side of ridge 14$^c$ slopes downwardly to the face of member 14 while the outer edge of ridge 14$^c$ is vertical with respect to the face of member 14. The aforementioned vertical side of ridge 14$^c$ affords an outer track for cam follower portion 13$^b$ of latching arm 13, the latter, under most conditions, being so biased as to tend to hold portion 13$^b$ thereof in contact with said outer track, as will hereinafter be described, while the vertical sides of cylindrical hub portion 14$^a$ afford an inner track for cam follower 13$^b$. At spaced intervals the ridge 14$^c$ is provided with transverse cuts or slots 14$^d$ (Figs. 3 and 5) which permit cam follower 13$^b$ under its aforementioned bias to transfer, under certain conditions hereinafter to be described, from the outer track afforded by ridge 14$^c$ to the inner track afforded by hub portion 14$^a$. As will herein appear, the transfer of cam follower 13$^b$ from the aforementioned outer track to the aforementioned inner track as cam member 14 rotates, affords unlatching of switch mechanism 11 to automatically initiate a defrost period in the refrigerating system, it being understood that one or more of such transverse slots 14$^d$ may be provided in ridge 14$^c$ and that such slots may be angularly displaced at any interval depending on the number, frequency and time of day at which defrost periods are desired. It is also to be understood that cam member 14 may be rotated by chronometric device 12 at any given speed, the embodiment illustrated in the drawings assuming one complete rotation every 24 hours.

As aforementioned, the inwardly and downwardly sloping innermost side of ridge 14$^c$ is also adapted to coact with cam follower 13$^b$, the end of which is beveled as best shown at 13$^c$ in Fig. 4 to permit cam follower 13$^b$ to transfer from the aforementioned inner track to the aforementioned outer track at any point; such transfer occurring under conditions to be hereinafter described during which the bias of latching arm 13 may be reversed, such transfer affording relatching of switch 11 as an incident to termination of the defrost period in a manner hereinafter described.

To facilitate transfer of cam follower 13$^b$ from its outer to its inner track, as aforementioned, the face of cam member 14 may additionally be provided with a cam surface 14$^e$ (Figs. 3 and 5) adjacent the vertical side of ridge 14$^c$ and concentric therewith, such surfaces 14$^e$ as may be provided in each case rising from the face of member 14 to a plane substantially half the height of ridge 14$^c$, and then leveling off in a plane parallel to the face of member 14, the aforementioned plane of the leveled portion 14$^e$ coinciding with the bottom of slots 14$^d$. As will be apparent, such cam surfaces 14$^e$ as may be provided are in each case positioned so as to precede (with respect to the direction of rotation of cam member 14) and extend across each of the slots 14$^d$ provided in ridge 14$^c$. The cam surfaces 14$^e$ are designed to impart a lateral movement to cam follower 13$^b$ as it rides upon the top surface thereof to facilitate transfer of the cam follower from its outer to its inner track, it being understood that the resiliency of the intermediate portion 13$^a$ of latching arm 13 permits such lateral movement against an inherent bias of cam follower 13$^b$ toward the face of cam member 14.

Moreover, as best shown in Fig. 3, the peripheral side of cam surface 14$^e$ (vertical with respect to the face of cam member 14) affords an auxiliary outer track for cam follower 13$^b$ which by-passes slot 14$^d$ and which track prevents movement of the cam follower through the slot when the cam follower is caused to follow such auxiliary track.

As best shown in Fig. 5, cam surface 14$^e$ terminates in a second sloping surface coinciding with one side of slot 14$^d$, the latter being of more or less V-shape to prevent binding of cam follower 13$^b$ in the slot should a reversal of the bias of arm 13 take place before cam member 14 has been rotated far enough to move slot 14$^d$ out of registry with cam follower 13$^b$.

The reverse face of cam member 14 may be provided with an annular indicating plate or dial 16 (Fig. 1 and Fig. 4) preferably marked in a suitable manner with the hours of the day. As will be understood, when cam member 14 is set in accordance with the hour of the day, the slot or slots 14$^d$ afford initiation of a defrost period in accordance with their angular position on cam member 14. To facilitate initial setting or subsequent resetting of cam member 14 as well as to afford external indication of such setting, the cam member 14 is so positioned as to permit its peripheral portion to extend beyond the confines of the enclosing casing of the switch, the cover member thereof, as best shown in Fig. 1, being provided with a slot for such purpose. It will also be observed that the peripheral edge of the rim 14$^a$ of member 14 is preferably knurled to facilitate manual setting thereof. Moreover, the provision of auxiliary or by-pass track 14$^e$ on the face of cam member 14 permits inadvertent rotation of cam member 14 in a direction the reverse of its normal direction of rotation without damaging cam follower 13$^b$ and without permitting it to drop through slot 14$^d$ to initiate an unwanted defrost period, the cam follower 13$^b$ during such reverse rotation merely riding on the auxiliary track and by-passing slot 14$^d$.

For purposes of describing the mode of operation of the aforedescribed defrost mechanism and its coaction with the refrigerating system in which it is employed, assume that the contacts of defrost mechanism 10 are closed and that the system is under the control of the normal control switch S, which for purposes of illustration may be assumed to open and close the circuit to motor M in such a manner as to maintain the evaporator temperature between a cut-in point of 25° F. and a cut-out point of 10° F. Further assume that the defrosting mechanism 10 if free to operate would open its switch 11 at 36° F. and close the same at 45° F. Under the assumed state of facts the switch 11 would tend to open the motor circuit at all values within the range of control switch S. Accordingly, the latching arm 13 would be biased into engagement with the outer track of cam member 14 afforded by its ridge 14c due to the influence of over-center spring 11f of switch mechanism 11. The aforementioned outer track of cam member 14, however, prevents U-shaped member 11e of switch 11 (rigidly connected to latching arm 13) from actuating contactor carrier 11c in view of the lost motion relationship therebetween, contactor carrier 11c under the bias of spring 11d therefore maintaining its contactor 11b in bridging engagement with stationary contacts 11a. Thus the motor circuit (Fig. 1) is maintained from L1 to motor M, through switch S to a terminal T1 of switch 11, through the contactor 11b, to terminal T2 of switch 11 and thence through a terminal T to L2. The terminal T is merely a common terminal for L2 connected both to the T2 terminal of switch 11 and to chronometric device 12, the latter, as will be apparent, being connected across L1, L2 for the supply of electrical energy thereto.

As best shown in Fig. 3, as cam member 14 rotates, cam follower 13b (under its bias as aforedescribed) will travel along the aforementioned outer track to eventually ride up on cam surface 14e and at the appropriate time drop through slot 14d to the inner track afforded by hub portion 14a of cam member 14. Such transfer from outer to inner track permits pivotal movement of arm 13 to unlatch member 11e of switch 11, which in turn strikes the contactor carrier 11c to move the latter against its bias to open the motor circuit regardless of the position of switch S, thereby initiating a defrost period.

When the evaporator has reached a temperature sufficiently high (45° F. under the assumed state of facts) to trip switch 11 to closed position to restore the circuit to motor M, the latching arm 13 will be reset. Such resetting is accomplished through the reversal of the bias of latching arm 13 under the influence of spring 11f to cause the cam follower portion 13b to ride up the inwardly sloping side of ridge 14c and over the edge thereof to restore the cam follower to the outer track, rim portion 14b of the cam member 14 serving as a stop to limit further outward movement of the cam follower.

As will be apparent, as the refrigerating system pulls down to a temperature below the cut-out point of switch 11 (say 36°) the latter will again tend to open thus reversing the bias of arm 13 to cause cam follower 13b to catch on the outer track of cam member 14 to prevent such opening of switch 11 until the cam has rotated to a point where a slot 14d again comes into registry with cam follower 13b.

Even though the refrigerating system should pull down so quickly as to reverse the bias of arm 13 before cam follower 13b has completely passed out of registry with the slot 14d through which it dropped to initiate a defrost period, the cam follower 13b will not drop a second time through such slot 14d inasmuch as it will be prevented from so doing by the auxiliary or by-pass track afforded by the vertical edge of cam surface 14e. Thus switch 11 is positively prevented from cycling the motor and the defrost period is positively terminated by the pressure or temperature responsive means of switch 11, independently of any manufacturing tolerances in the timing mechanism, width of slot 14d or thickness of cam follower 13b, etc.

The defrost period, therefore, is of minimum duration thereby effectively preventing food spoilage which might occur where the defrost period is longer than necessary, especially in instances where ambient temperatures are a big factor, as for example, where the refrigerator door is frequently opened, or in "reach-in" cases which are open at all times.

Moreover, if, as cam follower 13b approaches the cam surface 14e preparatory to initiating a defrost period, the refrigerating system is at an abnormally high temperature, as for example, due to a power failure, the latching arm and cam follower 13b will be biased toward the rim 14b of cam member 14 and the cam follower will ride on the auxiliary or by-pass track rather than up the cam surface 14e. Thus an undesirable defrost period will be automatically skipped.

While the embodiment of the invention just described has been illustrated in connection with pressure responsive switches, it will be obvious that such switches might be operated by temperature responsive thermostats instead of by pressure of the evaporator. It will therefore be understood that the term "pressure responsive" as used in the appended claims, is meant to include equivalent temperature responsive means. Also it will be clear that the invention may be applied to the control of other forms of energy supply, such as the control of flow of gas by controlling valves, and may be utilized in other ways than as defrosting means in a refrigerating system.

Various modifications of the embodiment of the invention illustrated will readily suggest themselves to those skilled in the art and are intended to be covered if within the scope of the appended claims, it being understood that certain features of the invention disclosed but not claimed herein are being claimed in the copending application of William E. Brown, S. N. 187,107, filed September 27, 1950.

I claim:

1. For an electric switch, fluid condition responsive operating mechanism for actuation thereof, latching means for maintaining said actuating mechanism in a given position regardless of the state of said condition, said latching means comprising a latch member connected with said actuating mechanism and having a cam follower portion, and a cam member having first and second tracks for said cam follower and comprising means affording transfer of said cam follower at a selected point from said first track to said second track to unlatch said actuating mechanism and being shaped to permit return of said cam follower to said first track at any point thereon as an incident to operation of said actuating mechanism in response to said fluid condition to actuate the switch.

2. For an electric switch, in combination, fluid condition responsive actuating mechanism for actuation of the switch, latching means for maintaining said fluid condition responsive means in a given position regardless of the state of said fluid condition, said latching means comprising a latching member connected with said actuating mechanism and having a cam follower portion, a rotatable cam member having a first track and a second track for said cam follower and having at least one transverse slot affording transfer of said cam follower from said first track to said second track to unlatch said actuating mechanism, and means for affording latching of the actuating mechanism by transfer of said cam follower from said second track to said first track at any point on the latter as an incident to operation of said actuating mechanism in response to said condition.

3. For a refrigerating system having energy supply means, means for periodically interrupting the supply of energy to said system to defrost the same and comprising, in combination, switch means responsive to a fluid thermal condition of the system, latching means to render said switch means normally incapable of operation, said latching means comprising a latching member connected to said switch means and having a cam follower portion, a rotatable cam member having first and second tracks for said cam follower and at least one transfer slot affording movement of said cam follower from said first to said second track for unlatching said switch means to initiate defrosting of the refrigerating system, and means affording transfer of said cam follower from said second to said first track at any point on the latter for relatching said switch means upon response thereof to said condition to terminate defrosting.

4. A fully automatic defrost mechanism for addition to existing refrigerating systems which include means for supplying energy to the refrigerating system and means for normally controlling said supply of energy, comprising, in combination, switch means ultimately responsive to temperature in said system to be placed in series relationship with the energy supply control means to periodically disable the latter to effect defrosting of the system, means for latching said switch means against operation, said latching means comprising a latching member connected to said switch means and having a cam follower portion, a rotatable cam member having a first and a second track for said cam follower and having at least one slot affording transfer of said cam follower from said first to said second track to unlatch said switch means at fixed intervals to initiate defrosting, said cam being shaped and said latching member having a resilient portion to permit transfer by said switch means of said cam follower from said second to said first track at any point on the latter to relatch said switch means upon operation thereof in response to said condition to terminate defrosting.

5. For an electric switch, in combination, mechanism movable from a first actuating position to a second actuating position in response to a fluid condition for actuating the switch, a cam device movable at a selected rate, a latch connected to said mechanism for movement therewith and having a cam follower for cooperation with said cam device, said cam device affording a track to retain said latch in position to maintain said mechanism in said first position irrespective of the state of said fluid condition and having a discontinuity effecting release of said latch for movement of the latter with said mechanism, said cam device being shaped to permit release of said latch from said track only at said discontinuity and to permit return of said latch to said track at any point thereon by movement of said latch by said mechanism to said first position.

6. In a latch for a switch, in combination, a rotatable cam and a follower member having a portion for connection with the switch, said cam having a track cooperating with said follower to maintain the same in a first position and a discontinuity to release said follower member for movement to a second position, said follower member being biased laterally toward said track and said cam having a sloping section adjoining said track to permit return of said follower member to said track at any point on the same.

7. In a latch for a switch having an actuator responsive to a condition, in combination, a cam and a follower member having a portion for connection to and movement with said actuator, said cam comprising a track for cooperation with said follower member to maintain the latter in position to prevent operation of the actuator regardless of the state of the condition, said track having a discontinuity for effecting release of said follower member for movement with the actuator, and means comprising a resilient portion of said follower member and a sloping surface on said cam to permit return of said follower member to said track at any point on the latter as an incident to movement of said follower member by said actuator.

References Cited in the file of this patent

UNITED STATES PATENTS

| | | |
|---|---|---|
| 2,095,102 | Philipp | Oct. 5, 1937 |
| 2,114,766 | Heitman | Apr. 19, 1938 |
| 2,162,709 | Gill, Sr. | June 20, 1939 |
| 2,366,635 | McCloy | Jan. 2, 1945 |
| 2,410,014 | Clark | Oct. 29, 1946 |
| 2,522,199 | Shreve | Sept. 12, 1950 |
| 2,587,026 | Beiser | Feb. 26, 1952 |
| 2,602,865 | Maurer | July 8, 1952 |